United States Patent
Ichikawa et al.

(10) Patent No.: US 10,146,959 B2
(45) Date of Patent: Dec. 4, 2018

(54) INFORMATION PROCESSING APPARATUS TO MANAGE OPERATION AUTHORITY OF AN APPLICATION PROGRAM

(71) Applicant: SONY CORPORATION, Tokyo (JP)

(72) Inventors: Hirotake Ichikawa, Tokyo (JP); Tsuyoshi Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 640 days.

(21) Appl. No.: 14/612,487

(22) Filed: Feb. 3, 2015

(65) Prior Publication Data

US 2015/0235040 A1   Aug. 20, 2015

(30) Foreign Application Priority Data

Feb. 14, 2014   (JP) .................................. 2014-026494

(51) Int. Cl.
*G06F 21/62* (2013.01)
*G06F 3/0484* (2013.01)

(52) U.S. Cl.
CPC .......... *G06F 21/629* (2013.01); *G06F 3/0484* (2013.01); *G06F 21/6209* (2013.01)

(58) Field of Classification Search
None
See application file for complete search history.

(56) References Cited

U.S. PATENT DOCUMENTS

| | | | |
|---|---|---|---|
| 2010/0205667 A1* | 8/2010 | Anderson | G06F 3/013 726/19 |
| 2014/0082747 A1* | 3/2014 | Negoro | G06F 21/31 726/28 |

FOREIGN PATENT DOCUMENTS

| | | | | |
|---|---|---|---|---|
| EP | 2490371 A1 * | 8/2012 | ............. | H04L 41/28 |
| JP | 2013-143150 A | 7/2013 | | |
| JP | 5622870 B2 * | 11/2014 | | |

* cited by examiner

*Primary Examiner* — Joseph P Hirl
*Assistant Examiner* — Hassan Saadoun
(74) *Attorney, Agent, or Firm* — Chip Law Group

(57) ABSTRACT

Provided is an information processing apparatus including a display unit that displays a window that controls an application program, an operation unit that receives a user's operation to the window, an imaging unit that captures an image of a range where the user can view the display unit and operate the operation unit, a recognition unit that recognizes users within the image, an authority information management unit that manages authority information in which the application program is associated with an authorized user of the application program, and a window management unit that makes the application program execute a process according to operation content of the operation unit when the user's operation is received in the operation unit and the window is operated and the user coincides with the authorized user of the application program of the window, on the basis of the authority information.

15 Claims, 12 Drawing Sheets

FIG. 3

| USER ID | ATTRIBUTE | SCROLLING | CLICKING | KEY INPUT | COPY | ... |
|---------|-----------|-----------|----------|-----------|------|-----|
| A | OWNER | OK | OK | OK | OK | ... |
| B | — | OK | OK | NG | NG | ... |
| C | — | OK | OK | NG | NG | ... |
| D | — | OK | OK | NG | NG | ... |

FIG. 4
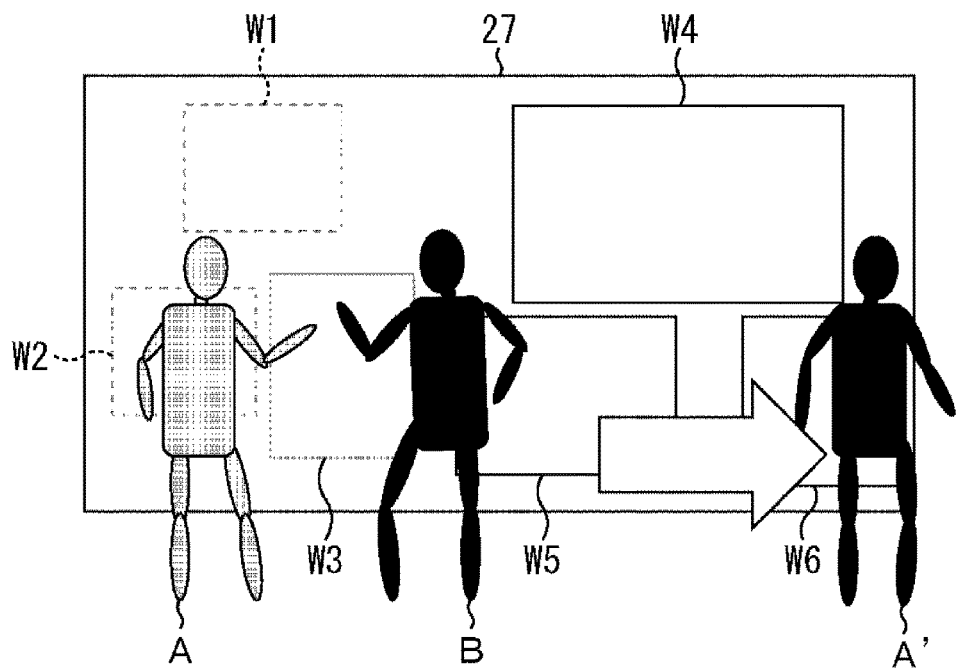
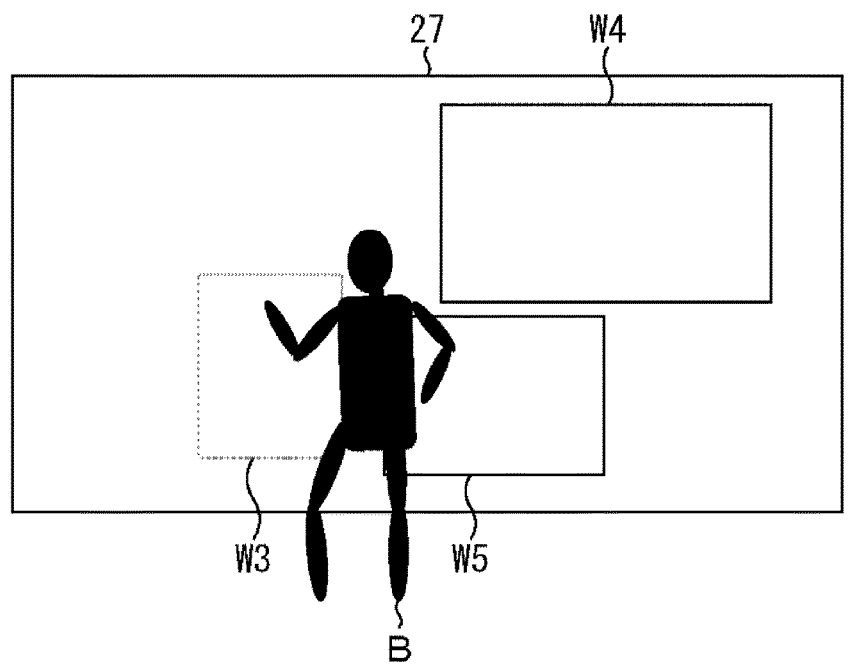

FIG. 5

| USER ID | ATTRIBUTE | SCROLLING | CLICKING | KEY INPUT | COPY | ... |
|---|---|---|---|---|---|---|
| A | OWNER | OK | OK | OK | OK | ... |
| B | BORROWER | OK | OK | OK | OK | ... |
| C | — | OK | OK | NG | NG | ... |
| D | — | OK | OK | NG | NG | ... |

FIG. 8
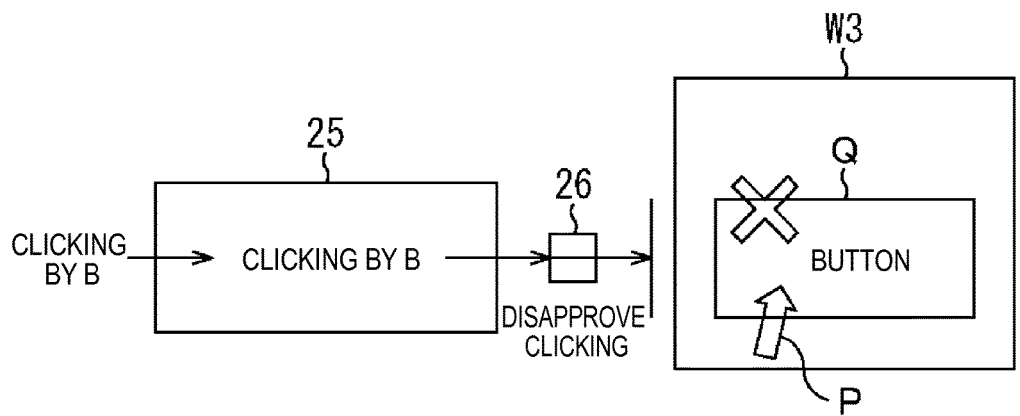
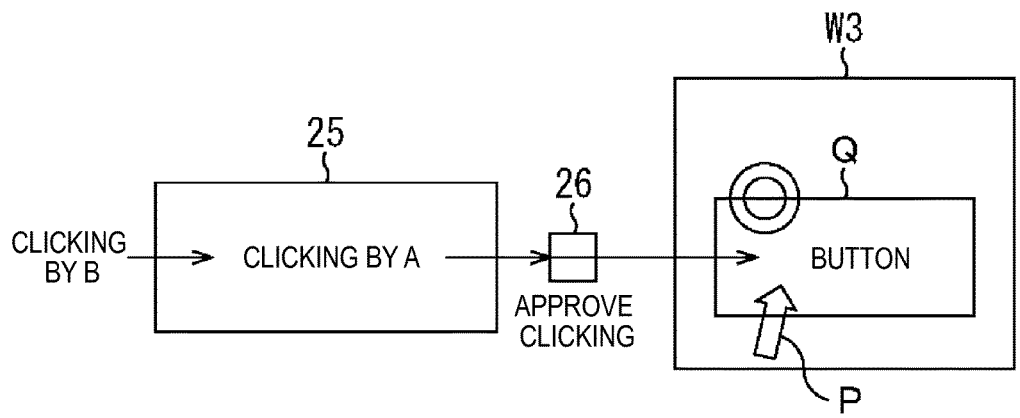

INFORMATION PROCESSING APPARATUS TO MANAGE OPERATION AUTHORITY OF AN APPLICATION PROGRAM

CROSS REFERENCE TO RELATED APPLICATIONS

This application claims the benefit of Japanese Priority Patent Application JP 2014-026494 filed Feb. 14, 2014, the entire contents of which are incorporated herein by reference.

BACKGROUND

The present technology relates to an information processing apparatus and method, an information processing system, and a program, and in particular, relates to the information processing apparatus and method, the information processing system, and the program that allow management of operation authority of an application program without performing troublesome setting when utilizing the application program by a plurality of users on a large-sized display or the like.

In recent years, a display device which includes a large-sized display provided with a touch panel or the like and which allows a plurality of users to operate a window that controls the same content (application program) simultaneously is spreading.

In such a display device, since the window of one piece of content can be simultaneously browsed by a plurality of users, it is important to protect privacy and security, and owner information and authority information of browsing and operations or the like are normally imparted to the content.

As a system of managing such authority, the one that performs management of approving or inhibiting the operations and browsing by setting a level of operation and browsing authority for a certain user or a group and combining it with a user recognition result has been proposed (for example, see JP 2013-143150A).

SUMMARY

However, as in a method in JP 2013-143150A, by the system of statically setting authority for each piece of content, in the case that the user who is an owner of the content leaves that place, a state of permitting operations by other users is not allowed.

Accordingly, it is taken into consideration to allow setting of the authority for each piece of content, however, an operation of setting the authority for each piece of content and for each user may be required and burdens on the user increase.

The present technology is implemented in consideration of such a situation, and is, in particular, for easily and dynamically changing the setting of the authority of content when utilizing a display device on which a plurality of users can simultaneously operate the same content.

An information processing apparatus according to an embodiment of the present technology includes a display unit configured to display a window that controls an application program, an operation unit configured to receive an operation from a user to the window, an imaging unit configured to capture an image of a range where the user is capable of viewing the display unit and operating the operation unit, a recognition unit configured to individually recognize at least one user within the image captured by the imaging unit, an authority information management unit configured to manage authority information in which the application program and a user having operation authority of the application program are associated, and a window management unit configured to, in the case that the operation by the user is received in the operation unit and the window is operated, make a process according to operation content of the operation unit be executed by the application program, when the user who has operated the operation unit and is recognized by the recognition unit coincides with the user having the operation authority of the application program of the window, on the basis of the authority information.

The authority information management unit may associate main operation authority in the operation authority of the application program with a user who has activated the application program and register the main operation authority to the authority information.

The authority information management unit may register a user ID identified by an image of a user who has activated the application program, the image being captured by the imaging unit, and the main operation authority in the operation authority of the application program, in association, to the authority information.

In a case that the operation unit is operated, the window management unit may make the process according to the operation content of the operation unit be executed by the application program, when the user operating the operation unit, who is captured by the imaging unit, is present near the user having the main operation authority, on the basis of the authority information.

In the case that the operation unit is operated, the authority information management unit may register quasi operation authority to be the operation authority of the application program based on the main operation authority in the authority information of the application program and a user ID of the user operating the operation unit in association, when the user operating the operation unit, who is captured by the imaging unit, is present near the user having the main operation authority, on the basis of the authority information. The window management unit may make the process according to the operation content of the operation unit be executed by the application program.

The authority information management unit may associate the users having the main operation authority and the quasi operation authority with each piece of operation content to the application program and manage the authority information. The operation content to the application program may include scrolling, clicking, key input, and a copy operation.

In the case that the operation unit is operated, the window management unit may display a user who is not registered in association with either of the main operation authority and the quasi operation authority of the authority information in the at least one user captured by the imaging unit and recognized by the recognition unit by information selectable, by the operation unit. When the operation unit is operated and one of pieces of the selectable information is selected by the user associated with the main operation authority, the authority information management unit may register a user ID of the user associated with the selected selectable information and the quasi operation authority in association.

The information with which the user who is not registered in association with either of the main operation authority and the quasi operation authority of the authority information is selected by the operation unit may be an icon that identifies the user who is not registered in association with either of the main operation authority and the quasi operation authority of the authority information.

In the case that the operation unit is operated, the window management unit may display a user who is not registered in association with either of the main operation authority and the quasi operation authority of the authority information in the at least one user captured by the imaging unit and recognized by the recognition unit by information selectable, by the operation unit.

When the operation unit is operated and one of pieces of the selectable information is selected by the user associated with the quasi operation authority, the authority information management unit may register a user ID of the user associated with the selected selectable information and the quasi operation authority in association, when the user registered in association with the selected selectable information and the user associated with the main operation authority have a prescribed relationship.

The prescribed relationship between the selected user registered in association with the selected selectable information and the user associated with the main operation authority may be a relationship in which the main operation authority is registered for the user registered in association with the selected selectable information and the quasi operation authority is registered for the user associated with the main operation authority in the authority information of the application program of another window, or in which the quasi operation authority is registered for the user registered in association with the selected selectable information and the main operation authority is registered for the user associated with the main operation authority in the authority information of the application program of the another window. The display unit may be a touch panel integrated with the operation unit.

The authority information management unit may delete the authority information when a user who is registered in association with main operation authority is not present within the image captured by the imaging unit, when prescribed time elapses after a state that the user is not present within the image captured by the imaging unit is attained, when the operation unit is operated and the window is closed, or when logout is performed.

An information processing method according to an embodiment of the present technology includes displaying a window that controls an application program by a display unit, receiving an operation from a user to the window, capturing an image of a range where the user is capable of viewing the display unit and operating the window, recognizing at least one user within the captured image individually, managing authority information in which the application program and a user having operation authority of the application program are associated, and making, in the case that the operation by the user is received and the window is operated, a process according to operation content be executed by the application program, when the user who has operated the window and is recognized coincides with the user having the operation authority of the application program of the window on the basis of the authority information.

A program according to an embodiment of the present technology causes a computer to execute processes including displaying a window that controls an application program, receiving an operation from a user to the window, capturing an image of a range where the user is capable of viewing the window displayed in the process of the display step and performing the operation received by the process of the operation step, recognizing at least one user within the image captured in the process of the imaging step individually, managing authority information in which the application program and a user having operation authority of the application program are associated, and making, in the case that the operation by the user is received in the process of the operation step and the window is operated, the process according to operation content received in the process of the operation step be executed by the application program, when the user who has performed the operation received in the process of the operation step and is recognized by the process of the recognition step coincides with the user having the operation authority of the application program of the window, on the basis of the authority information.

An information processing system according to an embodiment of the present technology includes a management terminal, and an information processing apparatus. The information processing apparatus includes a display unit configured to display a window that controls an application program, an operation unit configured to receive an operation from a user to the window, an imaging unit configured to capture an image of a range where the user is capable of viewing the display unit and operating the operation unit, a recognition unit configured to individually recognize at least one user within the image captured by the imaging unit, an authority information management unit configured to manage authority information in which the application program and a user having operation authority of the application program are associated, a window management unit configured to, in the case that the operation by the user is received in the operation unit and the window is operated, make a process according to operation content of the operation unit be executed by the application program, when the user who has operated the operation unit and is recognized by the recognition unit coincides with the user having the operation authority of the application program of the window, on the basis of the authority information, and a first communication unit configured to transmit authority management information to the management terminal, and receive the authority management information edited by the management terminal. The authority information management unit updates the authority management information on the basis of the authority management information edited by the management terminal.

The management terminal includes an editing unit configured to edit the authority management information transmitted from the information processing apparatus, and a second communication unit configured to receive the authority management information transmitted from the information processing apparatus, and transmit the authority management information edited by the editing unit to the information processing apparatus.

On an embodiment of the present technology, the window that controls the application program is displayed by the display unit, the operation from the user to the window is received, the image of the range where the display unit can be viewed by the user and the operation can be received is captured, the user within the captured image is individually recognized, the authority information in which the application program and the user having the operation authority of the application program are associated is managed, and in the case that the operation by the user is received and the window is operated, the process according to the operation content is executed by the application program, when the user who has performed the operation coincides with the user having the operation authority of the application program of the window, on the basis of the authority information.

The information processing apparatus on an embodiment of the present technology, and the information processing system may be independent apparatus and system, or may be a block that performs information processing.

According to an embodiment of the present technology, when utilizing a display device on which a plurality of users can simultaneously operate the same content, setting of the authority of the content can be easily and dynamically changed.

BRIEF DESCRIPTION OF THE DRAWINGS

FIG. 3 is a diagram illustrating an example of an authority management table;

FIG. 4 is a diagram illustrating an action of a user to a display unit and corresponding operation authority;

FIG. 5 is a diagram illustrating an example of the authority management table when setting a "borrower";

FIG. 8 is a diagram illustrating an action when performing an operation for which the operation authority by a user other than an "owner" is approved;

DETAILED DESCRIPTION OF THE EMBODIMENT(S)

Figure 1:
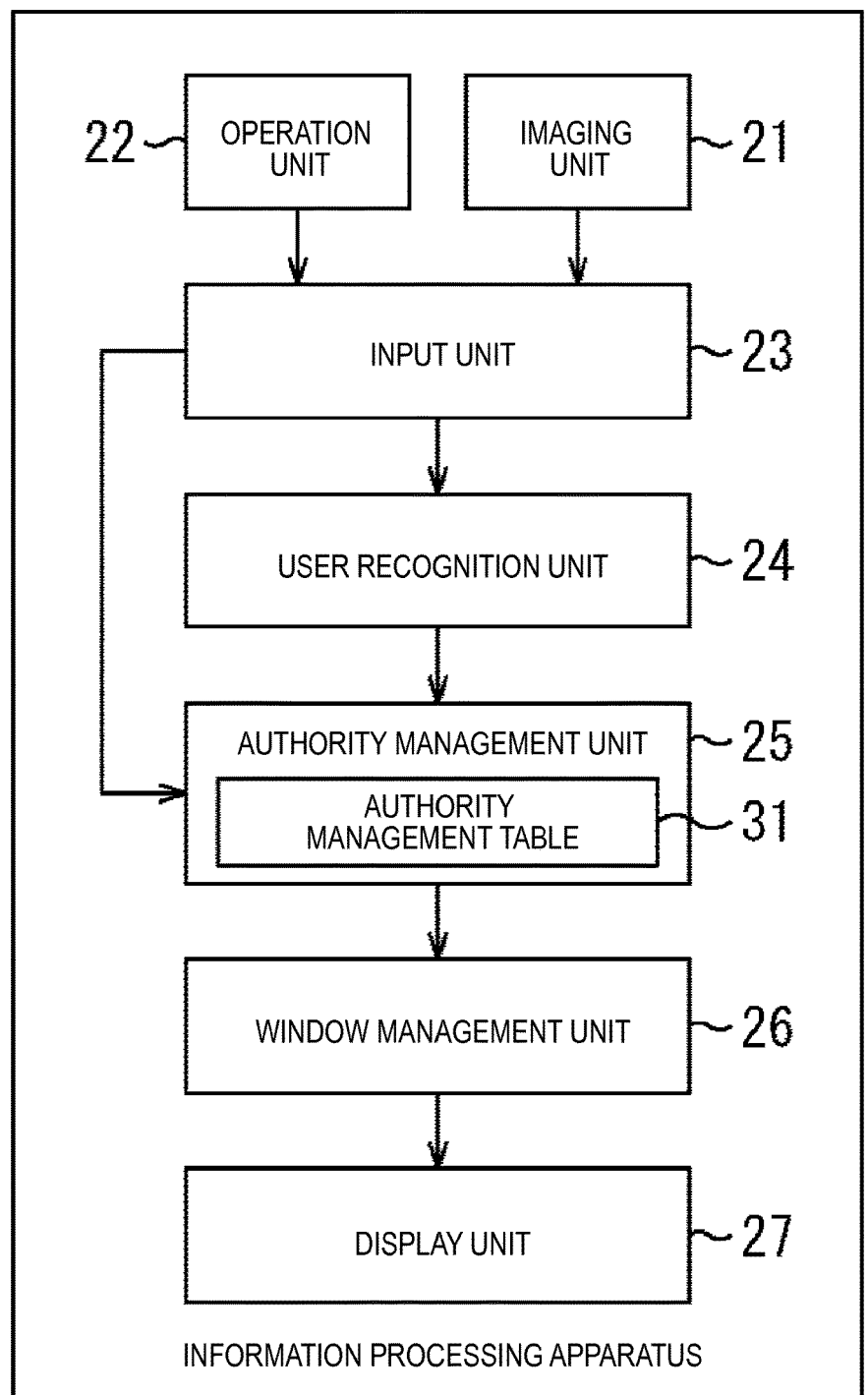
FIG. 1 is a diagram illustrating a configuration example of an embodiment of an information processing apparatus to which the present technology is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order:

1. First embodiment (an example that only a user set as an "owner" can set a "borrower")
2. Second embodiment (an example that even the user set as the "borrower" can further set the "borrower")
3. Third embodiment (an example that the "borrower" can be set from a remote terminal)
   1. <First Embodiment>
<Configuration Example of Information Processing Apparatus>

FIG. 1 illustrates a configuration example of an appearance of an embodiment of the information processing apparatus to which the present technology is applied. An information processing apparatus 11 in FIG. 1 includes a large-sized display unit 27 that executes content including a software program or the like, displays a processing result of the content or the like in units of windows and also receives an operation. The information processing apparatus 11 can make the same content be viewed by a plurality of users and receive the operation. At the time, the information processing apparatus 11 manages operation authority of the user from whom the operation is received in units of windows that manage the content.

In more detail, the information processing apparatus 11 includes an imaging unit 21, an operation unit 22, an input unit 23, a user recognition unit 24, an authority management unit 25, a window management unit 26, and the display unit 27.

The imaging unit 21 is constituted of a charge coupled device (CCD), a complementary metal oxide semiconductor (CMOS), or the like. The imaging unit 21 captures an image of a range where the user who views the window of each piece of content displayed at the display unit 27 of the information processing apparatus 11 or inputs the operation to the window is present, and supplies the captured image to the input unit 23.

The operation unit 22 is constituted of a touch panel provided on the display unit 27 or the like, receives operation input of the user, generates an operation signal according to operation content, and outputs the operation signal to the input unit 23 together with information of an operation position on the display unit 27. Also, the operation unit 22 further includes an operation button, a keyboard, or the like, and in the case that they are operated, outputs the operation signal corresponding to the operation content to the input unit 23 together with the information of positions where the operation button and the keyboard are arranged.

The input unit 23 receives the image supplied from the imaging unit 21, and input of the operation signal and the information of the operation position supplied from the operation unit 22, outputs the information of the image to the user recognition unit 24, and also supplies the operation signal and the information of the operation position to the authority management unit 25.

The user recognition unit 24 extracts a face image of the user captured in the image supplied from the input unit 23, and also generates information indicating at which browsing position to the display unit 27 the user is present from the information of the position where the face image is extracted. In more detail, the user recognition unit 24 extracts information of an interval between left and right eyes or a distance from a tip of a nose to a jaw or the like for example, as information of a feature amount for identifying the face image, from the extracted face image, generates a user ID (identifier) based on the combination thereof, and supplies the user ID to the authority management unit 25 together with the information of the browsing position.

The authority management unit 25 recognizes the operation content according to the operation signal and from which user the operation is performed (operation subject) from the operation signal and the information of the operation position supplied via the input unit 23 and the user ID and the information of the browsing position supplied from the user recognition unit 24, on the basis of the operation signal and the information of the operation position supplied from the input unit 23, and executes a process according to a combination of the recognized operation content and the user to be the operation subject.

More specifically, when activating the content which is a prescribed application program and newly displaying the window where the information for controlling the content is displayed, the authority management unit 25 defines the user to be the operation subject who has activated the window corresponding to the content as an owner of the window, and registers the user ID of the user to an authority management table 31.

Here, the authority management table 31 is a table that manages the operation authority of each user who is browsing the window for each piece of the content managed by the window displayed on the display unit 27. Since the authority management table 31 is set for each window, information that identifies the authority management table 31 and information that identifies the window are managed in association. In the authority management table 31, the operation authority corresponding to the operation content can be managed, and the operation authority can be set corresponding to the operation content such as scrolling, clicking, key input and copying as the operation content for example.

For example, in the case that the content corresponding to the window displayed on the display unit 27 is activated and the window is newly displayed, the authority management unit 25 newly generates the authority management table 31 corresponding to the content of the window. Then, the authority management unit 25 registers all the user IDs at the browsing positions capable of browsing the newly activated window, corresponding to a display position of the window that is supplied from the window management unit 26. Also, the authority management unit 25 registers the information of the "owner" having main operation authority corresponding to the user ID of the user at the browsing position corresponding to the operation position of the operation signal which activates the content of the new window, among the users at the browsing positions capable of browsing the newly activated window, and registers the information of the operation authority approved for the "owner".

Also, for example, in the case that the information of the operation position and the operation signal is supplied, the authority management unit 25 specifies which window is operated on the basis of the information of the display position of each window displayed on the display unit 27 supplied from the window management unit 26, and reads the corresponding authority management table 31.

Next, the authority management unit 25 specifies the user who has generated the operation signal by specifying the user ID at the browsing position corresponding to the operation position of the operation signal from the user ID and the information of the browsing position supplied from the user recognition unit 24.

Further, the authority management unit 25 refers to the user ID of the user who has generated the supplied operation signal on the authority management table 31, and when the "owner" for example is registered as the information that approves the operation corresponding to the corresponding user ID, supplies the operation signal to the window management unit 26.

At the time, the window management unit 26 executes the content according to the supplied operation signal, changes the window so as to indicate an execution result, and displays the window at the display unit 27. That is, the operation signal from the user for whom the "owner" is registered for example as the information that approves the operation authority of the content of the window is received, a corresponding process is executed by the window management unit 26, and a result according to the operation content is displayed at the display unit 27.

On the other hand, the authority management unit 25 refers to the user ID of the user who has generated the supplied operation signal on the authority management table 31, and when the "owner" for example is not registered as the information that approves the operation authority to the corresponding user ID, does not supply the operation signal to the window management unit 26. That is, the operation signal from the users other than the user for whom the "owner" is registered as the information that approves the operation authority is not received.

Also, in the case that the operation content of the operation signal from the user registered as the "owner" of the window is the content to edit the authority management table 31, the authority management unit 25 reflects an editing result of the authority management table 31 according to the operation content. Thus, the user of the user ID registered as the "owner" registered on the authority management table 31 can set a "borrower" to be quasi operation authority following the main operation authority to the user ID of the user to be permitted to borrow and operate the window.

As a result, for example, the authority management unit 25 refers to the user ID of the user who has generated the supplied operation signal on the authority management table 31, and when the "owner" which is the main operation authority is not registered to the corresponding user ID but the "borrower" is registered, supplies the operation signal to the window management unit 26. That is, the operation signal from the user registered as the "borrower" of the content of the window is received similarly to the operation signal from the user registered as the "owner", the corresponding process is executed by the window management unit 26, and the processing result according to the operation content is displayed at the display unit 27.

Since the authority can be set for each operation content on the authority management table 31, for example, all the operation authority can be approved for the user of the user ID for whom the "owner" is registered, but only "scrolling" can be permitted for the user of the user ID for whom the "borrower" is registered.

<Authority Management Process>

Figure 2:
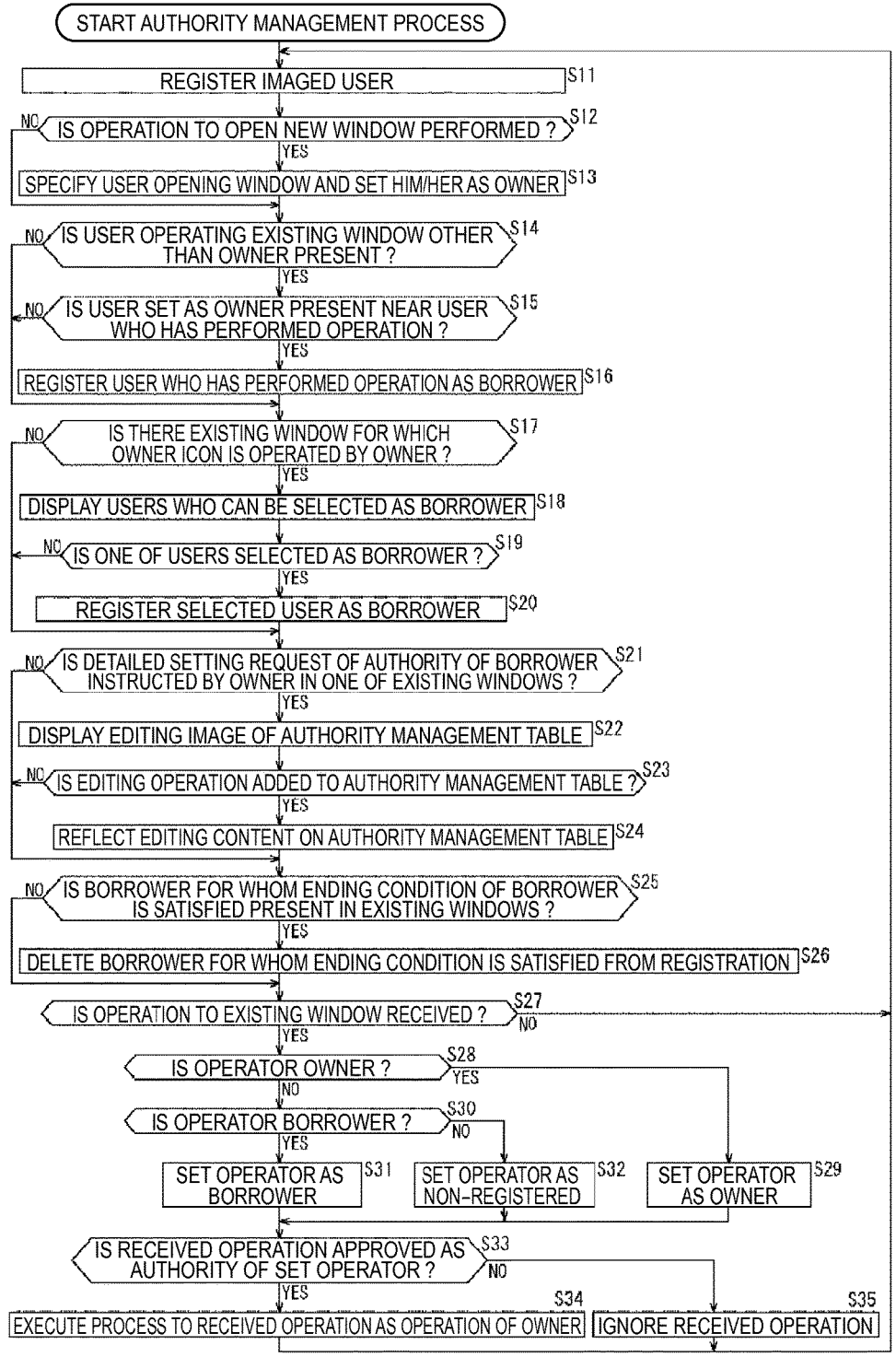
FIG. 2 is a flowchart illustrating an authority management process in the information processing apparatus in FIG. 1.

Next, referring to a flowchart in FIG. 2, an authority management process by the information processing apparatus 11 in FIG. 1 will be described.

In step S11, the authority management unit 25 registers the user ID to the authority management table 31 for each window, from the user ID and the information of the browsing position generated by the user recognition unit 24 on the basis of the feature amount of the face image of the user present in the image captured by the imaging unit 21, and the information of the display position of each window supplied from the window management unit 26.

That is, the authority management unit 25 reads the authority management table 31 corresponding to the individual window corresponding to the information that identifies the window from the supplied user ID and browsing position, the information that identifies the window and the information of the display position.

Next, the user ID at the browsing position corresponding to the display position of the individual window is extracted and registered to the individual authority management table 31.

The authority management table 31 is the one illustrated in FIG. 3, for example. The authority management table 31 in FIG. 3 is provided with items of the user ID, an attribute, scrolling, clicking, key input and copy from the left. Here, the attribute is the item to which the attribute of the authority imparted to the user corresponding to the user ID is registered, and whether the corresponding user is the "owner" to whom the main operation authority is imparted or is the "borrower" approved to borrow and operate the window is registered. Also, each of "scrolling", "clicking", "key input" and "copy" is the operation content to be managed, "OK" is registered when the operation authority is approved, and "NG" is registered when the operation authority is not approved.

In the authority management table 31 in FIG. 3, it is indicated that four of the user IDs "A" to "D" are present at positions from which the window can be browsed. Also, it is indicated that the user of the user ID "A" among them is registered as the "owner", "OK" is registered for "scrolling", "clicking", "key input" and "copy", and all the operation authority is approved. On the other hand, it is indicated that the users "B" to "D" are not registered as the "owner" or the "borrower", but "OK" is registered for "scrolling" and "clicking", and the operation authority is approved for the operation content of "scrolling" and "clicking"

In step S12, the authority management unit 25 determines whether or not the operation unit 22 is operated via the input unit 23 and the operation signal to open a new window is supplied, and in the case that the operation signal to open a new window is supplied, the process advances to step S13.

In step S13, the authority management unit 25 supplies the operation signal to the window management unit 26, makes the application program of the corresponding content be activated, and makes the corresponding window be displayed at the display unit 27. At the time, the authority management unit 25 acquires the information of the display position of the newly displayed window from the window management unit 26, and newly generates the corresponding authority management table 31. Further, the authority management unit 25 sets the "owner" having the main operation authority to the user ID of the user at the browsing position corresponding to the operation position of the operation signal.

That is, when the content including the new application program is activated and the corresponding new window is opened by the process, the corresponding authority management table 31 is newly generated, and the "owner" is set to the attribute of the user ID of the user who has executed the operation of opening the window. On the other hand, in the case that the operation signal to open a new window is not supplied in step S12, the process of step S13 is skipped.

In step S14, the authority management unit 25 determines whether or not the operation signal and the information of the operation position are supplied and the supplied operation signal is by the user ID other than the user to whom the "owner" of the window at the browsing position corresponding to the operation position is set. That is, in the process of step S14, practically, whether or not the existing window is operated by the user other than the "owner" is determined. In step S14, when it is considered that the existing window is operated by the user other than the "owner", for example, the process advances to step S15.

In step S15, the authority management unit 25 determines whether or not the user set as the "owner" of the window is present near the user other than the owner, who has operated the existing window. In more detail, the authority management unit 25 first obtains a relative distance between the browsing position corresponding to the operation position on the window of the user other than the "owner" and the browsing position of the user set as the "owner" from the user ID and the information of the browsing position recognized on the basis of the image captured by the imaging unit 21 by the user recognition unit 24. Then, the authority management unit 25 determines whether or not the user set as the "owner" of the window is present near the user other than the owner, who has operated the existing window, depending on whether or not the obtained relative distance is within a prescribed distance. In step S15, when it is determined that the user set as the "owner" of the window is present near the user other than the owner, who has operated the existing window, the process advances to step S16.

In step S16, the authority management unit 25 sets the "borrower" to the attribute of the user ID of the user present at the browsing position corresponding to the operation position, that is registered in the authority management table 31 of the window present at the operation position accompanying the supplied operation signal.

On the other hand, in the case that the window is not operated by the user other than the owner in step S14, or the user set as the "owner" of the window is not present near the user other than the owner, who has operated the existing window, in step S15, the process of step S16 is skipped.

That is, by the above process, even in the case that the existing window is operated by the user other than the "owner", when the user set as the "owner" of the window is present nearby, it can be considered that the user set as the "owner" approves the operation by the other user not set as the "owner". Then, in such a case, the "borrower" can be set to the user ID of the user other than the owner in the authority management table 31 of the operated window without a need of a complicated operation by the "owner". As a result, since the "borrower" is automatically set, the "borrower" can be appropriately set while saving time and labor of a setting operation of the "borrower" by the "owner".

More specifically, for example, as illustrated in an upper part of FIG. 4, in the case that windows W1 to W6 are displayed at the display unit 27 and a window W3 for which the user A is set as the "owner" is operated by the user B not set as the "owner", since the user A is present near the user B, by the process of step S16, the "borrower" is set to the attribute of the user B as illustrated in the authority management table 31 in FIG. 5. At the time, for the information of the operation authority of the user B, the information of the operation authority of the "owner" is copied and registered. As a result, for the operation authority of the user B, "OK" is set similarly to the "owner" for all operation contents of "scrolling", "clicking", "key input" and "copy".

As a result, even when the user A leaves the browsing position of the window W3 as a user A' as illustrated by an arrow in the upper part of FIG. 4 and only the user B is left at the browsing position of the window W3 as illustrated in a lower part of FIG. 4, the user B set as the "borrower" by the above-described process can operate the window W3 with the operation authority similar to that of the "owner". That is, the user who operates the window W3 almost simultaneously with the user A set as the "owner" of the window W3 is set as the "borrower" and supplied with the operation authority similar to that of the "owner". Therefore, the user set as the "owner" can set the "borrower" just by having the user with whom the "owner" wants to perform the operation together operate the window W3 near himself/herself, and the authority can be imparted without performing complicated authority setting.

Figure 6:
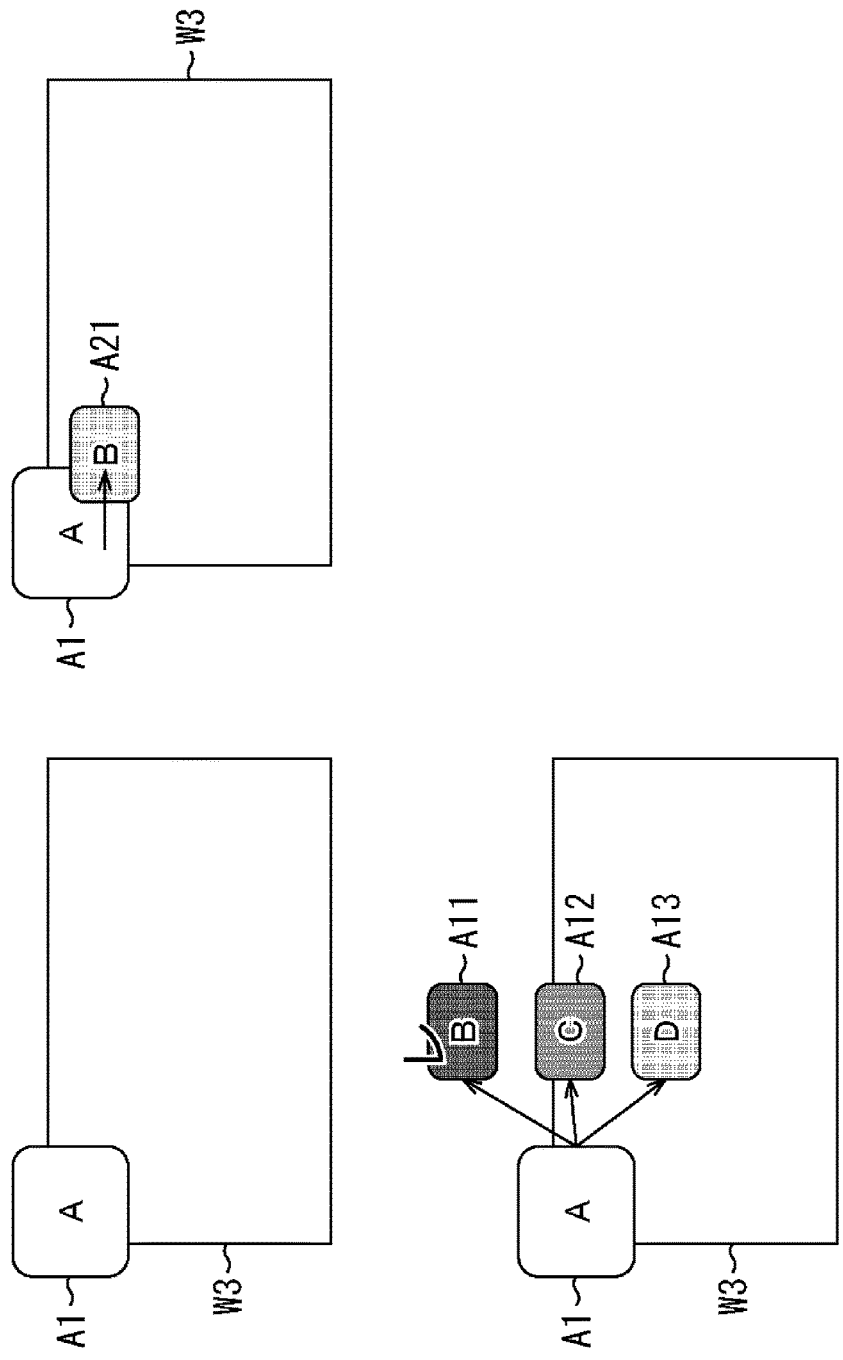
FIG. 6 is a diagram illustrating a user interface when setting the "borrower"

In step S17, the authority management unit 25 determines whether or not the operation signal to operate an owner icon A1 at an upper left part of FIG. 6 is supplied by the user to whom the "owner" is set in the authority management table 31 of the window corresponding to the operation position, on the basis of the operation signal and the information of the operation position supplied via the input unit 23 from the operation unit 22.

In the case that the owner icon A1 in FIG. 6 is operated in step S17, in step S18, the authority management unit 25 reads the information of the authority management table 31 and supplies the information to the window management unit 26. On the basis of the information, the window management unit 26 displays registrant icons A11 to A13 corresponding to the users B to D who can be set as the "borrower" registered other than the owner as illustrated in a lower left part of FIG. 6.

That is, the window W3 is displayed at the display unit 27 by a configuration illustrated in the upper left part of FIG. 6, for example. In the window W3 in FIG. 6, the owner icon A1 formed of the face image or the like of the user A set as the "owner" is displayed at the upper left part. The owner icon A1 is displayed at the display unit 27 including a touch panel or the like, and receives only the operation by the user set as the "owner". When it is operated by being tapped or the like, for example, by the user set as the "owner", the authority management unit 25 reads the information of the authority management table 31, and supplies the information to the window management unit 26. On the basis of the information, the window management unit 26 displays the registrant icons A11 to A13 corresponding to the users B to D registered other than the owner in a state of being drawn out by arrows from the owner icon A1, as illustrated in the lower left part of FIG. 6, for example. Thus, the user A of the window W3 can recognize that the user A himself/herself can set the "borrower" to the users B to D.

In step S19, the authority management unit 25 determines whether or not the operation signal and the information of the operation position supplied via the input unit 23 from the operation unit operation unit 22 are supplied, one of the registrant icons A11 to A13 is operated as illustrated in the lower left part of FIG. 6, and the "borrower" is selected.

When it is determined that one of the registrant icons A11 to A13 is selected in step S19, in step S20, the authority management unit 25 sets the "borrower" to the user selected from the registrant icons A11 to A13 in FIG. 6, and updates the authority management table 31. Also, the authority management unit 25 supplies the information of the updated authority management table 31 to the window management unit 26. On the basis of the information of the updated authority management table 31, the window management unit 26 displays a borrower icon A21 at a lower right part of the owner icon A1 as illustrated in an upper right part of FIG. 6, for example.

That is, as illustrated in the lower left part of FIG. 6, the registrant icons A11 to A13 can receive only the operation by the owner, and when the operation is made by tapping, for example, a check mark is attached to display the information indicating that setting as the "borrower" is performed. In the lower left part of FIG. 6, the check mark is attached to the registrant icon A11 corresponding to the user B, and it is indicated that the user B is set as the "borrower".

By the process described above, the user set as the "owner" of the window can arbitrarily set the "borrower" managed in the authority management table 31 of the corresponding window.

Also, in the case that the owner icon is not operated in step S17, or in the case that none of the registrant icons is selected and the "borrower" is not set in step S19, the process of step S20 is skipped, and the process advances to step S21.

In step S21, the authority management unit 25 determines whether or not detailed setting of the "borrower" is requested. In step S21, in the case that the detailed setting of the "borrower" is requested by a long press of the owner icon A1 in the window W3 in FIG. 6 or the like for example, the process advances to step S22.

In step S22, the authority management unit 25 supplies the information of the corresponding authority management table 31 to the window management unit 26. On the basis of the supplied information of the authority management table 31, the window management unit 26 displays the authority management table 31 illustrated in FIG. 5 at the display unit 27. For the authority management table 31 illustrated in FIG. 5, that is displayed at the display unit 27, direct input can be performed by a keyboard or the like not shown in the figure for the item that is tapped, for example.

In step S23, the authority management unit 25 determines whether or not an editing operation is added to the authority management table 31 displayed at the display unit 27 on the basis of the operation signal and the information of the operation position that are supplied. In step S23, for example, in the case that the editing operation is added to the authority management table 31, the process advances to step S24.

In step S24, the authority management unit 25 performs updating by reflecting the operation corresponding to editing content on the authority management table 31, and supplies the updated authority management table 31 to the window management unit 26. The window management unit 26 displays the updated authority management table 31 at the display unit 27.

Figure 7:
FIG. 7 is a diagram illustrating an example of the authority management table when setting the operation authority corresponding to operation content.

That is, for example, by editing the operation authority of the operation content corresponding to "key input" corresponding to the user ID being the user B in FIG. 5 from "OK" to "NG", the authority management table 31 is updated as illustrated in FIG. 7, and displayed at the display unit 27.

By the above process, it is made possible to edit the authority management table 31 in detail by the user registered as the "owner" of the window.

When it is determined that the detailed setting is not requested in step S21, or when the editing operation is not added to the authority management table 31 in step S23, the process of the step S24 is skipped, and the process advances to step S25.

In step S25, the authority management unit 25 determines whether or not setting of the "borrower" for which a condition of ending the setting as the "borrower" is satisfied is present in the existing window. In step S25, in the case that the condition of ending the setting as the "borrower" is a lapse of prescribed time after the "borrower" is set, for example, it is considered that the condition is satisfied when the prescribed time elapses after the "borrower" is set, and the process advances to step S26.

In step S26, the authority management unit 25 deletes the setting of the "borrower" in the authority management table 31 for which the condition is satisfied, and updates the setting to the setting of the user not corresponding to either of the "owner" and the "borrower".

In step S25, when it is considered that the setting of the "borrower" for which the condition of ending the setting as the "borrower" is satisfied is not present in the existing window, the process of step S26 is skipped, and the process advances to step S27.

Also, the condition of ending the setting as the "borrower" in the existing window may be something other than the lapse of the prescribed time after the "borrower" is set as described above. Therefore, the condition may be, for example, the time when the process of deleting the setting of the "borrower" is performed by the user set as the "owner" by the process similar to the process of steps S17 to S20 or steps S21 to S24 described above. Further, the condition may be the time when the user set as the "borrower" executes the process of deleting the setting as the "borrower" by the process similar to the process of steps S17 to S20 or steps S21 to S24 described above, for example. Also, the setting of the "borrower" may be deleted for the user without the operation for the prescribed time or longer among the users set as the "borrower" after being registered in the authority management table 31 of the existing window. In addition, the setting of the "borrower" may be deleted when the window to be a target is closed, when the user set as the "owner" or the "borrower" logs out from a network, or when a state that the image is not captured for the prescribed time or longer by the imaging unit 21 continues or the like.

In step S27, the authority management unit 25 determines whether or not the operation signal to receive the operation to the existing window is supplied, and in the case that the corresponding operation signal is supplied for example, the process advances to step S28.

In step S28, the authority management unit 25 determines whether or not an operator who is the user at the corresponding browsing position is set as the "owner" in the authority management table 31 of the window corresponding to the operation signal, on the basis of the operation position accompanying the operation signal.

When it is considered that the operator of the operation signal is the "owner" in step S28, in step S29, the authority management unit 25 registers the operator of the supplied operation signal as the "owner".

Also, when it is considered that the operator of the operation signal is not the owner in step S28, in step S30, the authority management unit 25 determines whether or not the operator who is the user at the corresponding browsing position is set as the "borrower" in the authority management table 31 of the window corresponding to the operation signal, on the basis of the operation position accompanying the operation signal.

When it is considered that the operator of the operation signal is the "borrower" in step S29, in step S31, the authority management unit 25 registers the operator of the supplied operation signal as the "borrower".

Further, when it is considered that the operator of the operation signal is not the "borrower" in step S30, in step S32, the authority management unit 25 registers the operator of the supplied operation signal as neither the "owner" nor the "borrower".

In step S33, the authority management unit 25 determines whether or not the operation content of the operation signal is the operation for which the operation authority is approved for each operator, and when it is considered that it is the operation for which the operation authority is approved, the process advances to step S34.

In step S34, the authority management unit 25 supplies execution of the process by the operation content corresponding to the operation signal to the window management unit 26 so as to be executed to a software program of the window at the browsing position corresponding to the operation position, as the operation by the user set as the "owner". The window management unit 26 executes the process by the operation content corresponding to the operation signal as the operation by the user set as the "owner".

On the other hand, when it is considered that it is not the operation for which the operation authority is approved in step S33, in step S35, the authority management unit 25 abandons the supplied operation signal.

That is, by the above process, for example, in the case that it is the window of the content for which the user A is set as the "owner" and the operations by the users other than the owner are all set to "NG", as illustrated in an upper part of FIG. 8, when the operation signal to click a button Q on a window W11 by a pointer P by the user B is supplied, the authority management unit 25 abandons the supplied operation signal. As a result, since the operation signal is not supplied to the window management unit 26, an action by the operation signal is not executed to the application program corresponding to the window W11, and therefore a clicking operation to the button Q is not executed practically.

On the other hand, for example, in the case that it is the window of the content for which the user A is set as the "owner", the user B is set as the "borrower", and all the operations are set to "OK" similarly to the "owner", as illustrated in a lower part of FIG. 8, when the clicking operation of the button Q on the window W11 by the user B is supplied as the operation signal, the authority management unit 25 recognizes the supplied operation signal as the operation signal by the user A who is the "owner", and supplies the operation signal to the window management unit 26. As a result, since the operation signal is supplied to the window management unit 26, the action by the operation signal is executed to the application program corresponding to the window W11, and therefore the process of clicking the button Q by the user A is executed practically.

That is, by the above process, the process corresponding to the operation signal for which the operation authority is approved can be executed as the operation of the user set as the "owner" of the window to the software program of the window to which the operation is performed. Thus, in this case, for a file generated by the software program of the window for which the setting is performed as the "owner", even the operation corresponding to the operation signal by the user other than the "owner" is executed as the operation by the user set as the "owner".

2. <Second Embodiment>
<Example that Even the User Set as the "Borrower" can Set the "Borrower">

The example that only the user set as the "owner" can set the "borrower" has been described above, however, for example, the user set as the "borrower" may be able to set the "borrower" to a different user further, in place of the user set as the "owner".

<Authority Management Table Management Process>

Figure 9:
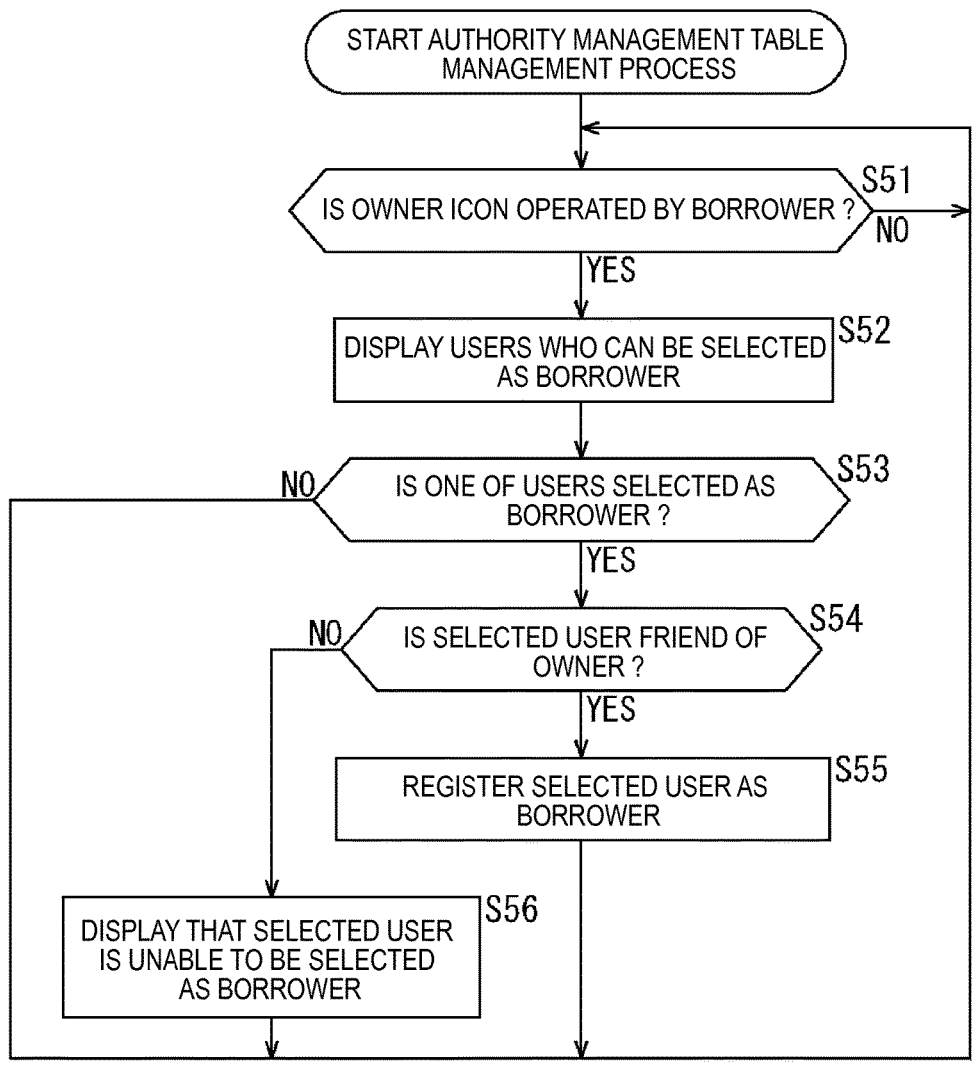
FIG. 9 is a flowchart illustrating an authority management table management process.

Next, referring to a flowchart in FIG. 9, an authority management table management process in which the user set as the "borrower" can set the "borrower" to the different user further in place of the user set as the "owner" will be described. The flowchart in FIG. 9 describes only the process in which the user set as the "borrower" sets the "borrower" to the different user further in place of the user set as the "owner" in the authority management table 31 managed by the flowchart in FIG. 2.

That is, in step S51, the authority management unit 25 determines whether or not the operation signal and the operation position supplied from the operation unit 22 via the input unit 23 are supplied, and the owner icon A1 in FIG. 6 is operated by the user set as the "borrower" from the information of the corresponding browsing position, for example.

In step S51, the similar process is repeated until it is determined that the owner icon A1 in FIG. 6 is operated by the user set as the "borrower". Then, when it is determined that the owner icon A1 illustrated in the upper left part of FIG. 6 is operated by the user set as the "borrower" in step S51, the process advances to step S52.

In step S52, the authority management unit 25 reads the corresponding authority management table 31, and supplies the authority management table 31 to the window management unit 26. The window management unit 26 displays the users who can be set as the "borrower" so as to be indicated by the registrant icons A11 to A13 in the lower left part of FIG. 6 on the basis of the supplied authority management table 31.

In step S53, the authority management unit 25 determines whether or not the operation unit 22 is operated and one of the registrant icons A11 to A13 is selected and set as the "borrower" by the user set as the "borrower". In step S53, for example, when it is considered that one of the registrant icons A11 to A13 is selected by the user set as the "borrower" and the "borrower" is set, the process advances to step S54.

In step S54, the authority management unit 25 determines whether or not the user newly set as the "borrower" is a friend of the user set as the "owner". In more detail, the authority management unit 25 refers to the authority management table 31 of the window managed by other application software managed by itself, and makes determination based on whether or not the user set as the "owner" of the window which is a process target is set as the "borrower" in the other authority management table 31 in which the user who is to be set as the "borrower" is set as the "owner".

Or, the authority management unit 25 makes determination based on whether or not the user set as the "owner" in the authority management table 31 which is the process target at present is set as the "borrower" in the other authority management table 31 in which the user who is to be newly set as the "borrower" is set as the "owner".

That is, the authority management unit 25 determines whether or not the user is a friend depending on whether or not there is a relationship that the user who is to be newly set as the "borrower" and the user set as the "owner" in the authority management table 31 of the process target set the "borrower" with each other in the other authority management table 31.

When there is the relationship described above, since the relationship between the user who is to be set as the "borrower" and the user set as the "owner" can be considered as friendship or the relationship similar to it, when the relationship is recognized, it is determined that the friendship is recognized.

In step S54, in the case that the user set as the "borrower" is considered as the friend of the user set as the "owner", the process advances to step S55.

In step S55, the authority management unit 25 sets the user newly set as the "borrower" as the "borrower", and updates the authority management table 31.

On the other hand, in step S54, in the case that the user set as the "borrower" is not considered as the friend of the user set as the "owner", the process advances to step S56.

In step S56, the authority management unit 25 supplies information indicating that the user newly set as the "borrower" is unable to be set as the "borrower" to the window management unit 26. On the basis of the information, the window management unit 26 displays the information indicating that it is difficult to set the user newly set as the "borrower" as the "borrower" at the display unit 27.

By the above process, in the case that the "borrower" is to newly set the other user as the "borrower", it is considered that the friendship or the relationship similar to the friendship exists when there is the relationship that the user set as the "owner" and the user who is to be newly set as the "borrower" set the "borrower" with each other in the other authority management table 31, and it is allowed to set the "borrower". Thus, even when it is not the user set as the "owner", that is, when it is the user set as the "borrower", the user can further set the "borrower" as long as the friendship (or, the relationship similar to it) exists between the user who is to be newly set as the "borrower" and the user set as the "owner".

As a result, even if it is the setting of the "borrower" by the user set as the "borrower", since only the user for whom a human relationship of the "owner" is taken into consideration can be set as the "borrower", privacy and security of the "owner" can be rationally maintained while reducing burdens of setting the "borrower" by the user set as the "owner".

3. <Third Embodiment>
<Example that the "Borrower" can be Set from a Remote Terminal>

The example that only the user operating the same information processing apparatus can set the "borrower" has been described above, however, for example, the user set as the "borrower" may be able to set the "borrower" from a remote location by utilizing a remote terminal.

Figure 10:
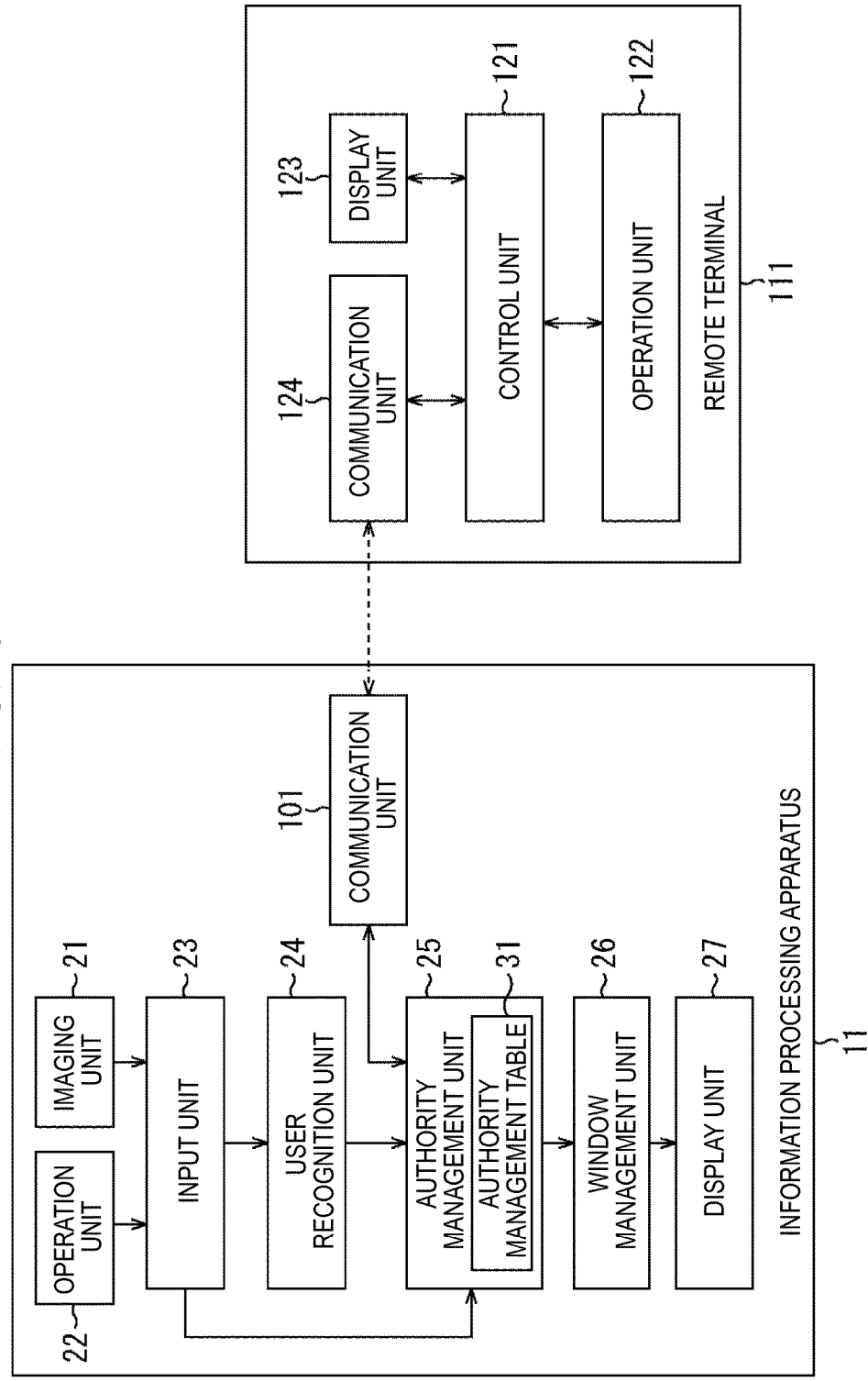
FIG. 10 is a diagram illustrating a configuration example of an embodiment of an information processing system to which the present technology is applied.

FIG. 10 illustrates a configuration example of an embodiment of an information processing system in which the "borrower" can be set from the remote location by utilizing the remote terminal. In FIG. 10, the configurations having the same function described with reference to FIG. 1 are denoted with the same reference numerals and the same names, and the description is appropriately omitted.

That is, the information processing system in FIG. 10 is constituted of the information processing apparatus 11 and a remote terminal 111. The information processing apparatus 11 in FIG. 10 basically has the function similar to that of the information processing apparatus 11 in FIG. 1, and further includes a communication unit 101 for communicating with the remote terminal 111. The communication unit 101 utilizes a public line or the like to transfer data and programs that may be necessary with a communication unit 124 of the remote terminal 111.

Also, the remote terminal 111 is constituted of a cellular phone, a smartphone, or the like for example, and includes a control unit 121, an operation unit 122, a display unit 123, and the communication unit 124. The control unit 121 controls the entire actions of the remote terminal 111. The operation unit 122 is constituted of an operation button, or a touch panel or the like integrated with the display unit 123 including a liquid crystal display (LCD), an organic electro luminescence (EL), or the like.

That is, the remote terminal 111 communicates with the information processing apparatus 11 by utilizing the public line or the like not shown in the figure, and when supply of the authority management table 31 is received, displays the authority management table 31 at the display unit 123, also receives the editing operation by the operation unit 122, returns the edited authority management table 31 to the information processing apparatus 11, and thus sets the "borrower" to the user registered in the authority management table 31 even in the remote location.

<Remote Authority Management Table Management Process>

Figure 11:
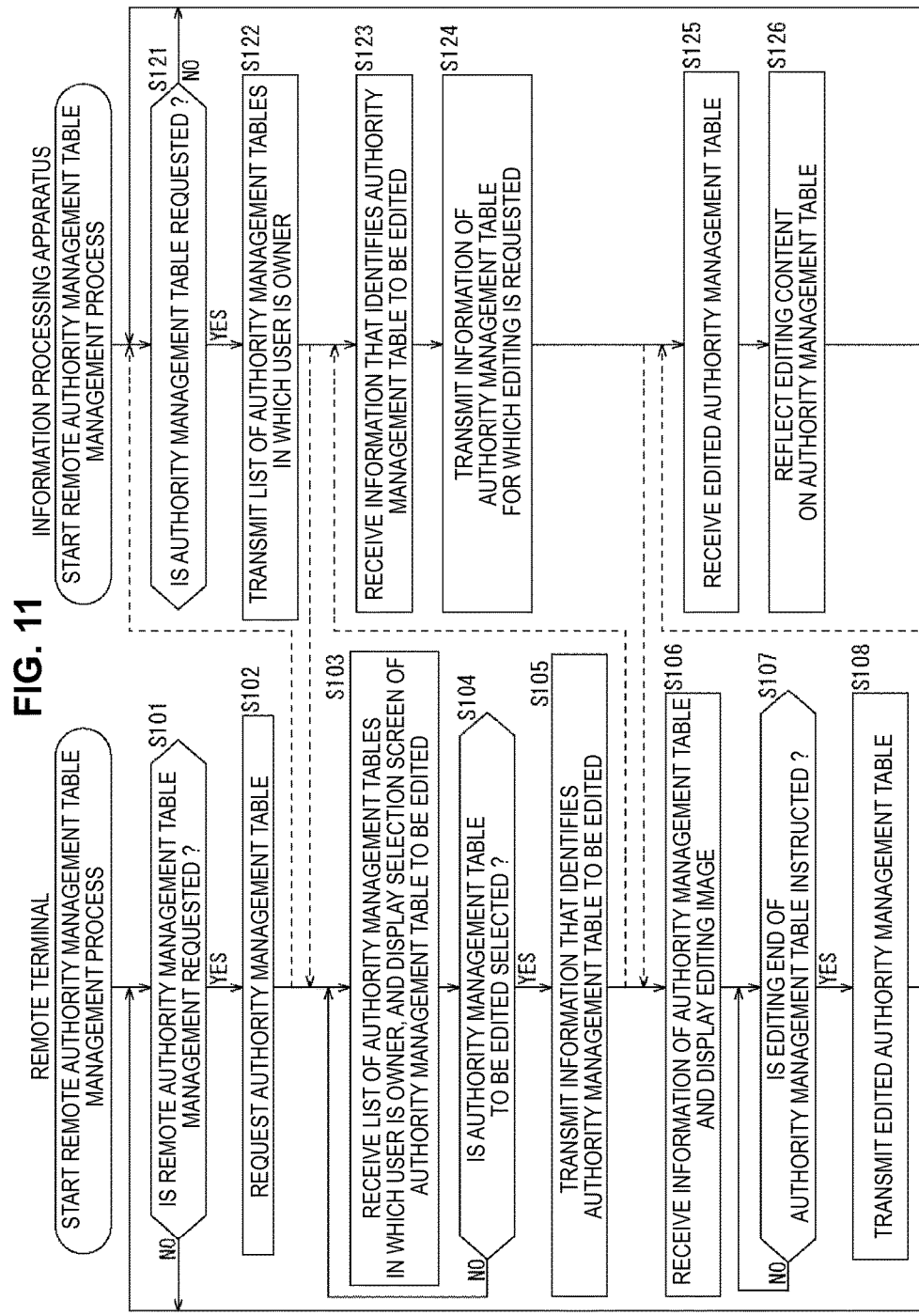
FIG. 11 is a flowchart illustrating a remote authority management table management process in the information processing system in FIG. 10.

Next, referring to a flowchart in FIG. 11, a remote authority management table management process by the information processing system in FIG. 10 will be described. The flowchart in FIG. 11 describes only the process that the user set as the "owner" in the authority management table 31 managed by the process of the flowchart in FIG. 2 edits the authority management table 31 by using the remote terminal 111.

In step S101, the control unit 121 determines whether or not the operation unit 122 is operated and the remote authority management table management process is requested, and repeats the similar process until it is requested. In step S101, in the case that the remote authority management table management process is requested for example, the process advances to step S102.

In step S102, the control unit 121 controls communication unit 124, and requests the authority management table 31 to the information processing apparatus 11. At the time, the control unit 121 adds the information that identifies the user of the remote terminal 111, identification information of the user ID or the like for example, and requests the authority management table 31. Also, at the time, in communication, encryption of the data that is transferred and an authentication process for the user are added according to a level of handling secret information or the like.

In step S121, the authority management unit 25 determines whether or not the authority management table 31 is requested from the remote terminal 111 by controlling the 101, and repeats the similar process until it is requested. In step S121, in the case that the authority management table 31 is requested by the process of S102 for example, the process advances to step S122.

In step S122, the authority management unit 25 retrieves, on the basis of the information of the user ID added to a request of the authority management table authority management table 31, the authority management tables 31 in which the corresponding user ID is set as the "owner", and transmits a list of retrieval results to the remote terminal 111 by controlling the communication unit 101.

In step S103, the control unit 121 controls the communication unit 124, receives the transmitted list of the authority management tables 31, and also displays at the display unit 123 a selection image which is a list of application program names or the like as the content managed in the authority management tables 31, and is for selecting editing of which authority management table 31 is to be requested.

In step S104, the control unit 121 determines whether or not the operation unit 122 is operated and one of the authority management tables 31 is selected to request the editing, and until it is determined that a selection is made, the process of steps S103 and S104 is repeated and the selection image is continuously displayed.

Then, when one of the authority management tables 31 is selected in step S104, in step S105, the control unit 121 controls the communication unit 124, and transmits information that requests the selected authority management table 31 to be edited to the information processing apparatus 11.

In step S123, the authority management unit 25 controls the communication unit 101 and receives the information that requests the selected authority management table 31 to be edited.

In step S124, the authority management unit 25 reads the information of the authority management table 31 for which the editing is requested, controls the communication unit 101, and transmits the authority management table 31 to the remote terminal 111.

In step S106, the control unit 121 receives the transmitted authority management table 31 by controlling the communication unit 124, and displays the authority management table 31 at the display unit 123 as an editing image.

In step S107, the control unit 121 determines whether or not the operation unit 122 is operated, the authority management table 31 displayed as the editing image is edited, and an end of the editing is instructed, and repeats the similar process until the end is instructed. Since the editing of the authority management table 31 is similar to the process described with reference to FIG. 5 and FIG. 7, the description is omitted.

In step S107, when the end of the editing is instructed and transmission of the edited authority management table 31 to the information processing apparatus 11 is instructed, in step S108, the control unit 121 controls the communication unit 124, and transmits the editing-completed authority management table 31 to the information processing apparatus 11.

In step S125, the authority management unit 25 controls the communication unit 101, receives the editing-completed authority management table 31 transmitted from the remote terminal 111, and in step S126, editing content of the received authority management table 31 is reflected and stored.

By the above process, since the authority management table 31 can be edited by the remote terminal 111 even from the remote location, utilization of the application program can be managed even from the remote location. Therefore, for example, a parent can manage use of the application program of a game or the like used by a child from the remote location or the like.

As described above, when utilizing the display device on which the plurality of users can simultaneously operate the same content, the setting of the authority of the content can be easily and dynamically changed.

Incidentally, the above series of processes can, for example, be executed by hardware, or can be executed by software. In the case where the series of processes is executed by software, a program configuring this software is installed in a computer included in dedicated hardware, or a general-purpose personal computer which can execute various functions when various programs are installed, etc., from a recording medium.

Figure 12:
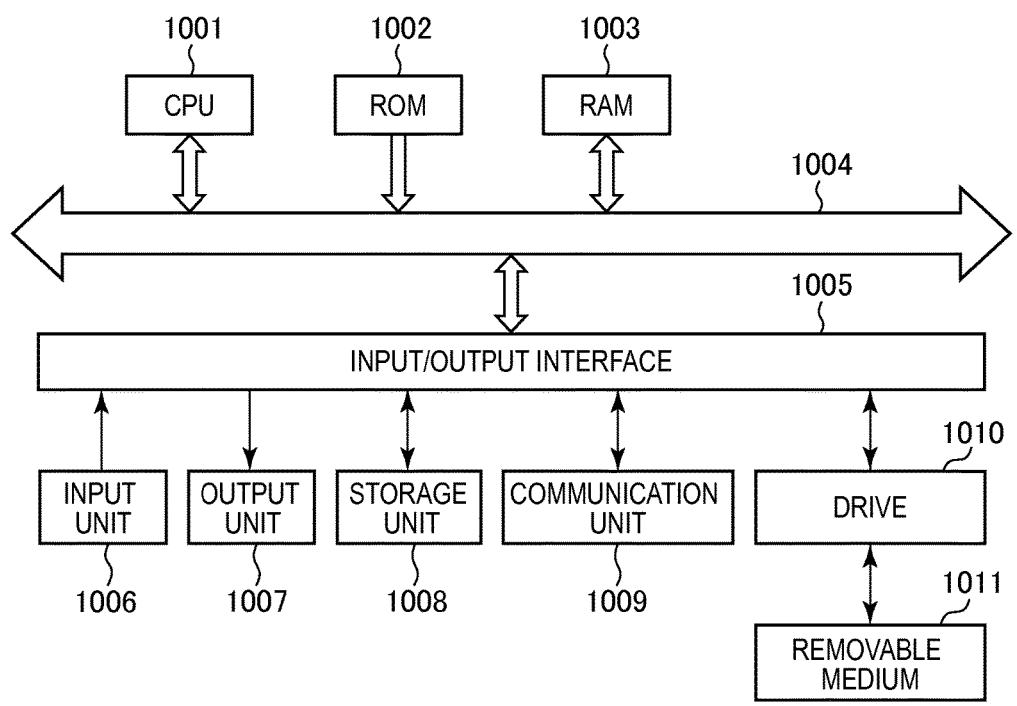
FIG. 12 is a diagram illustrating a configuration example of a general-purpose personal computer.

FIG. 12 shows a configuration example of a general-purpose personal computer. The personal computer includes a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input unit 1006 including an input device, such as a keyboard, a mouse, etc., which is used by the user to input an operation command, an output unit 1007 which outputs a process operation screen or an image of a process result to a display device, a storage unit 1008 including a hard disk drive etc. which stores a program or various items of data, and a communication unit 1009 including a LAN (Local Area Network) adaptor etc. which performs a communication process through a network typified by the Internet, are connected to the input/output interface 1005. Also, connected is a drive 1010 which reads and writes data from and to a removable medium 1011, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), or a semiconductor memory, etc.

The CPU 1001 executes various processes according to a program stored in the ROM 1002 or a program which is read from the removable medium 1011, such as a magnetic disk, an optical disk, a magneto-optical disk, or a semiconductor memory, etc., is installed in the storage unit 1008, and is loaded from the storage unit 1008 to the RAM 1003. The RAM 1003 also stores data which may be necessary when the CPU 1001 executes various processes, etc., as appropriate.

In the computer configured as described above, the CPU 1001 loads a program that is stored, for example, in the storage unit 1008 onto the RAM 1003 via the input/output interface 1005 and the bus 1004, and executes the program. Thus, the above-described series of processes is performed.

Programs to be executed by the computer (the CPU 1001) are provided being recorded in the removable medium 1011 which is a packaged medium or the like. Also, programs may be provided via a wired or wireless transmission medium, such as a local area network, the Internet or digital satellite broadcasting.

In the computer, by inserting the removable medium 1011 into the drive 1010, the program can be installed in the storage unit 1008 via the input/output interface 1005. Further, the program can be received by the communication unit 1009 via a wired or wireless transmission medium and installed in the storage unit 1008. Moreover, the program can be installed in advance in the ROM 1002 or the storage unit 1008.

It should be noted that the program executed by a computer may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below:

(1) An information processing apparatus including:
 a display unit configured to display a window that controls an application program;
 an operation unit configured to receive an operation from a user to the window;
 an imaging unit configured to capture an image of a range where the user is capable of viewing the display unit and operating the operation unit;
 a recognition unit configured to individually recognize at least one user within the image captured by the imaging unit;
 an authority information management unit configured to manage authority information in which the application program and a user having operation authority of the application program are associated; and
 a window management unit configured to, in the case that the operation by the user is received in the operation unit and the window is operated, make a process according to operation content of the operation unit be executed by the application program, when the user who has operated the operation unit and is recognized by the recognition unit coincides with the user having the operation authority of the application program of the window, on the basis of the authority information.

(2) The information processing apparatus according to (1), wherein the authority information management unit associates main operation authority in the operation authority of the application program with a user who has activated the application program and registers the main operation authority to the authority information.

(3) The information processing apparatus according to (1), wherein the authority information management unit registers a user ID identified by an image of a user who has activated the application program, the image being captured by the imaging unit, and the main operation authority in the operation authority of the application program, in association, to the authority information.

(4) The information processing apparatus according to (3), wherein, in a case that the operation unit is operated, the window management unit makes the process according to the operation content of the operation unit be executed by the application program, when the user operating the operation unit, who is captured by the imaging unit, is present near the user having the main operation authority, on the basis of the authority information.

(5) The information processing apparatus according to (3), wherein, in the case that the operation unit is operated, the authority information management unit registers quasi operation authority to be the operation authority of the application program based on the main operation authority in the authority information of the application program and a user ID of the user operating the operation unit in association, when the user operating the operation unit, who is captured by the imaging unit, is present near the user having the main operation authority, on the basis of the authority information, and wherein the window management unit makes the process according to the operation content of the operation unit be executed by the application program.

(6) The information processing apparatus according to (5), wherein the authority information management unit associates the users having the main operation authority and the quasi operation authority with each piece of operation content to the application program and manages the authority information.

(7) The information processing apparatus according to (6), wherein the operation content to the application program includes scrolling, clicking, key input, and a copy operation.

(8) The information processing apparatus according to (5),
wherein, in the case that the operation unit is operated, the window management unit displays a user who is not registered in association with either of the main operation authority and the quasi operation authority of the authority information in the at least one user captured by the imaging unit and recognized by the recognition unit by information selectable, by the operation unit, and wherein, when the operation unit is operated and one of pieces of the selectable information is selected by the user associated with the main operation authority, the authority information management unit registers a user ID of the user associated with the selected selectable information and the quasi operation authority in association.

(9) The information processing apparatus according to (8),
wherein the information with which the user who is not registered in association with either of the main operation authority and the quasi operation authority of the authority information is selected by the operation unit is an icon that identifies the user who is not registered in association with either of the main operation authority and the quasi operation authority of the authority information.

(10) The information processing apparatus according to (5),
wherein, in the case that the operation unit is operated, the window management unit displays a user who is not registered in association with either of the main operation authority and the quasi operation authority of the authority information in the at least one user captured by the imaging unit and recognized by the recognition unit by information selectable, by the operation unit, and wherein, when the operation unit is operated and one of pieces of the selectable information is selected by the user associated with the quasi operation authority, the authority information management unit registers a user ID of the user associated with the selected selectable information and the quasi operation authority in association, when the user registered in association with the selected selectable information and the user associated with the main operation authority have a prescribed relationship.

(11) The information processing apparatus according to (10),
wherein the prescribed relationship between the selected user registered in association with the selected selectable information and the user associated with the main operation authority is a relationship in which the main operation authority is registered for the user registered in association with the selected selectable information and the quasi operation authority is registered for the user associated with the main operation authority in the authority information of the application program of another window, or in which the quasi operation authority is registered for the user registered in association with the selected selectable information and the main operation authority is registered for the user associated with the main operation authority in the authority information of the application program of the another window.

(12) The information processing apparatus according to (3),
wherein the display unit is a touch panel integrated with the operation unit.

(13) The information processing apparatus according to (1),
wherein the authority information management unit deletes the authority information when a user who is registered in association with main operation authority is not present within the image captured by the imaging unit, when prescribed time elapses after a state that the user is not present within the image captured by the imaging unit is attained, when the operation unit is operated and the window is closed, or when logout is performed.

(14) An information processing method including:
displaying a window that controls an application program by a display unit;
receiving an operation from a user to the window;
capturing an image of a range where the user is capable of viewing the display unit and operating the window;
recognizing at least one user within the captured image individually;
managing authority information in which the application program and a user having operation authority of the application program are associated; and
making, in the case that the operation by the user is received and the window is operated, a process according to operation content be executed by the application program, when the user who has operated the window and is recognized coincides with the user having the operation authority of the application program of the window on the basis of the authority information.

(15) A program for causing a computer to execute processes including:
displaying a window that controls an application program;
receiving an operation from a user to the window;
capturing an image of a range where the user is capable of viewing the window displayed in the process of the display step and performing the operation received by the process of the operation step;
recognizing at least one user within the image captured in the process of the imaging step individually;
managing authority information in which the application program and a user having operation authority of the application program are associated; and
making, in the case that the operation by the user is received in the process of the operation step and the window is operated, the process according to operation content received in the process of the operation step be executed by the application program, when the user who has performed the operation received in the process of the operation step and is recognized by the process of the recognition step coincides with the user having the operation authority of the application program of the window, on the basis of the authority information.

(16) An information processing system including:
a management terminal; and
an information processing apparatus,
wherein the information processing apparatus includes
a display unit configured to display a window that controls an application program,
an operation unit configured to receive an operation from a user to the window,
an imaging unit configured to capture an image of a range where the user is capable of viewing the display unit and operating the operation unit,
a recognition unit configured to individually recognize at least one user within the image captured by the imaging unit,
an authority information management unit configured to manage authority information in which the application program and a user having operation authority of the application program are associated, a window management unit configured to, in the case that the operation by the user is received in the operation unit and the window is operated, make a process according to operation content of the operation unit be executed by the application program, when the user who has operated the operation unit and is recognized by the recognition unit coincides with the user having the operation authority of the application program of the window, on the basis of the authority information, and a first communication unit configured to transmit authority management information to the management terminal, and receive the authority management information edited by the management terminal, wherein the authority information management unit updates the authority management information on the basis of the authority management information edited by the management terminal, and wherein the management terminal includes an editing unit configured to edit the authority management information transmitted from the information processing apparatus, and a second communication unit configured to receive the authority management information transmitted from the information processing apparatus, and transmit the authority management information edited by the editing unit to the information processing apparatus.

What is claimed is:

1. An information processing apparatus, comprising:
    circuitry configured to:
        control a display device to display a first window of a plurality of windows that controls a first application program;
        receive an input from a first user of a plurality of users through the first window, wherein the input is associated with the first application program;
        control an imaging device to capture an image of an imaging space, wherein the imaging space comprises a region in which the first user operates the first window;
        recognize the first user from the captured image, based on a first face image of the first user, wherein the captured image includes the first face image of the first user;
        generate first information based on the first face image of the first user, wherein the first information comprises a first user ID of the first user;
        obtain first authority information of the first application program, wherein the first authority information indicates operation authority of the first application program,
            wherein the operation authority is associated with a corresponding user ID of each of the plurality of users;
        associate main operation authority of the first application program to the first user ID, based on the first information and the first authority information;
        execute the first application program based on the main operation authority of the first application program;
        determine a relative distance between the first user and a second user of the plurality of users, based on the captured image; and
        associate quasi operation authority of the first application program to the second user, based on the relative distance that is less than a threshold distance, wherein the quasi operation authority is defined by the first user.

2. The information processing apparatus according to claim 1, wherein the circuitry is further configured to register main operation authority information in the first authority information of the first application program,
    wherein the main operation authority information indicates the main operation authority of the first application program, and
    wherein the first application program is activated by the first user.

3. The information processing apparatus according to claim 1, wherein the circuitry is further configured to execute the first application program based on the second user.

4. The information processing apparatus according to claim 1, wherein the circuitry is further configured to:
    register quasi operation authority information in the first authority information of the first application program based on the main operation authority, wherein the quasi operation authority information indicates the quasi operation authority of the first application program; and
    execute the first application program, based on the quasi operation authority of the first application program.

5. The information processing apparatus according to claim 4, wherein the circuitry is further configured to associate the first user and the second user with operation content of the first application program.

6. The information processing apparatus according to claim 5, wherein the operation content of the first application program comprises at least one of scrolling, clicking, key input, or a copy operation.

7. The information processing apparatus according to claim 5,
    wherein the circuitry is further configured to control the display device to display an icon associated with a third user of the plurality of users, to select at least one content of the operation content,
    wherein the first authority information of the first application program excludes an identity of the third user,
    wherein the first user selects the at least one content of the operation content, and
    wherein the circuitry is further configured to:
        register a third user ID of the third user; and
        associate the at least one selected content of the operation content with the third user ID.

8. The information processing apparatus according to claim 7, wherein the icon identifies the third user.

9. The information processing apparatus according to claim 5,
    wherein the circuitry is further configured to control the display device to display an icon associated with a third user of the plurality of users, to select at least one content of the operation content,
    wherein the first authority information of the first application program excludes an identity the third user,
    wherein the third user has a relationship with the first user,
    wherein the second user selects the at least one content of the operation content associated with the third user, and
    wherein the circuitry is further configured to:
        register a third user ID of the third user; and
        associate the at least one selected content of the operation content with the third user ID.

10. The information processing apparatus according to claim 9, wherein the relationship between the third user and the first user is one of:
- a first relationship in which the third user has the main operation authority and the first user has the quasi operation authority, wherein the first relationship is in a second authority information of a second application program of a second window of the plurality of windows, or
- a second relationship in which the third user has the quasi operation authority and the first user has the main operation authority, wherein the second relationship is in the second authority information of the second application program of the second window.

11. The information processing apparatus according to claim 1, wherein the display device comprises a touch panel.

12. The information processing apparatus according to claim 2, wherein the circuitry is further configured to delete the first authority information, based on at least one of:
- absence of the first user within the captured image,
- closure of the first window, or
- execution of logout.

13. An information processing method, comprising:
in an information processing apparatus:
- controlling a display device to display a window that controls an application program;
- receiving an input from a first user of a plurality of users through the window, wherein the input is associated with the application program;
- controlling an imaging device to capture an image of an imaging space, wherein the imaging space comprises a region in which the first user operates the window;
- recognizing the first user from the captured image, based on a face image of the first user, wherein the captured image includes the face image of the first user;
- generating first information based on the face image of the first user, wherein the first information comprises a first user ID of the first user;
- obtaining authority information of the application program, wherein the authority information indicates operation authority of the application program,
  - wherein the operation authority is associated with corresponding user ID of each of the plurality of users;
- associating main operation authority of the application program to the first user ID, based on the first information and the authority information;
- executing the application program based on the main operation authority of the application program;
- determining a relative distance between the first user and a second user of the plurality of users, based on the captured image; and
- associating quasi operation authority of the application program to the second user, based on the relative distance that is less than a threshold distance, wherein the quasi operation authority is defined by the first user.

14. A non-transitory computer readable medium having stored thereon, computer-executable instructions for causing an information processing apparatus to execute operations, the operations comprising:
- controlling a display device to display a window that controls an application program;
- receiving an input from a first user of a plurality of users through the window, wherein the input is associated with the application program;
- controlling an imaging device to capture an image of an imagine space, wherein the imaging space comprises a region in which the first user operates the window;
- recognizing the first user from the captured image, based on a face image of the first user, wherein the captured image includes the face image of the first user;
- generating first information based on the face image of the first user, wherein the first information comprises a first user ID of the first user;
- obtaining authority information of the application program, wherein the authority information indicates operation authority of the application program,
  - wherein the operation authority is associated with corresponding user ID of each of the plurality of users;
- associating main operation authority of the application program to the first user ID, based on the first information and the authority information;
- executing the application program based on the main operation authority of the application program;
- determining a relative distance between the first user and a second user of the plurality of users, based on the captured image; and
- associating quasi operation authority of the application program to the second user, based on the relative distance that is less than a threshold distance, wherein the quasi operation authority is defined by the first user.

15. An information processing system, comprising:
a management terminal; and
an information processing apparatus, wherein the information processing apparatus comprises first circuitry configured to:
- control a display device to display a window that controls an application program;
- receive an input from a first user of a plurality of users through the window, wherein the input is associated with the application program;
- control an imaging device to capture an image of an imaging space, wherein the imaging space comprises a region in which the first user operates the window;
- recognize the first user from the captured image, based on a face image of the first user, wherein the captured image includes the face image of the first user;
- generate first information based on the face image of the first user, wherein the first information comprises a first user ID of the first user;
- obtain authority information of the application program, wherein the authority information indicates operation authority of the application program,
  - wherein the operation authority is associated with corresponding user ID of each of the plurality of users;
- associate main operation authority of the application program to the first user ID, based on the first information and the authority information;
- execute the application program based on the main operation authority of the application program;
- determine a relative distance between the first user and a second user of the plurality of users, based on the captured image; and
- associate quasi operation authority of the application program to the second user, based on the relative distance that is less than a threshold distance, wherein the quasi operation authority is defined by the first user;
- control a first transceiver to:
  - transmit the authority information to the management terminal; and
  - receive edited authority information from the management terminal; and update the authority information based on the edited authority information, wherein the management terminal comprises second circuitry configured to:

control a second transceiver to receive the authority information transmitted from the information processing apparatus;

edit the received authority information; and control the second transceiver to transmit the edited authority information to the information processing apparatus.

* * * * *